United States Patent

[11] 3,556,194

| [72] | Inventor | John Farrington<br>1204 W. Marshall Blvd., San Bernardino,<br>Calif. 92405 |
|---|---|---|
| [21] | Appl. No. | 827,523 |
| [22] | Filed | May 26, 1969 |
| [45] | Patented | Jan. 19, 1971 |

[54] TIRE TRUING DEVICE
6 Claims, 10 Drawing Figs.

| [52] | U.S. Cl. | 157/13 |
|---|---|---|
| [51] | Int. Cl. | B29h 21/08 |
| [50] | Field of Search | 157/13,<br>(Wheel Holder Digest); 144/288.1 |

[56] References Cited
UNITED STATES PATENTS

| 2,765,845 | 10/1956 | Bullis | 157/13 |
|---|---|---|---|
| 2,925,125 | 2/1960 | Curry | 157/13 |
| 3,080,899 | 3/1963 | Robertson | 157/13X |

*Primary Examiner*—Granville Y. Custer, Jr.
*Attorney*—Christie, Parker and Hale ABSTRACT: A tire truing machine capable of use in truing a tire either on a car or off of a car has a removable carriage and lift that carries a bearing block into which a shaft supporting a tire may enter as the carriage and lift is lifted off the floor into its upright position and locked in place in the machine. The machine is operable from either side to facilitate truing of tires on either side of an automobile.

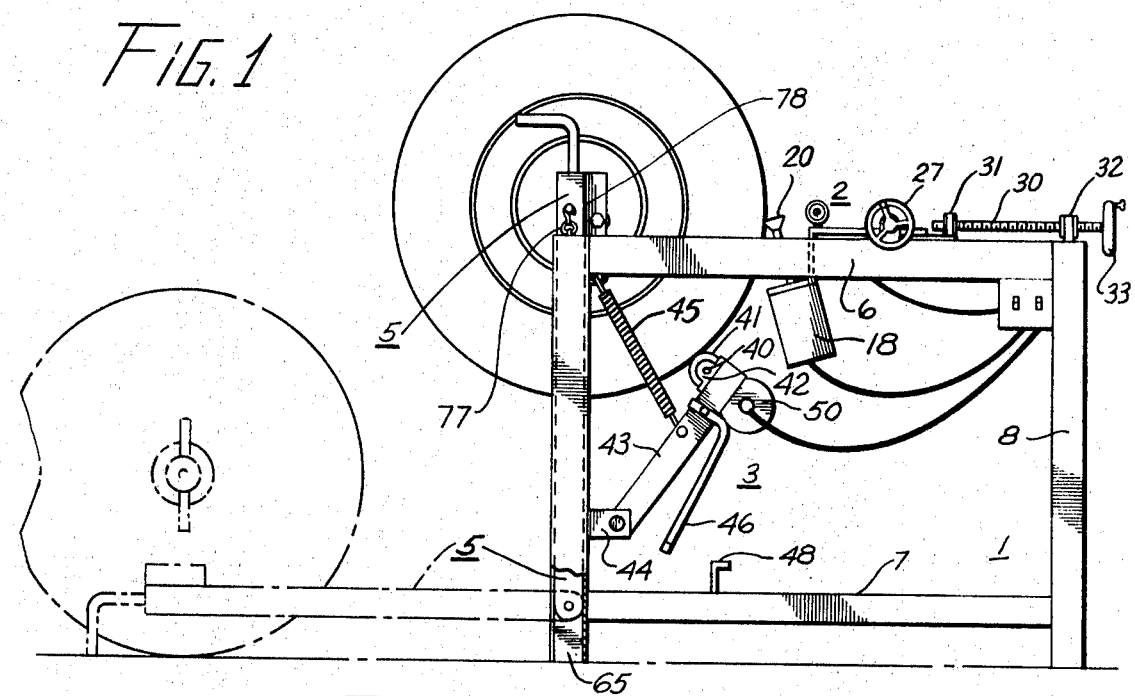
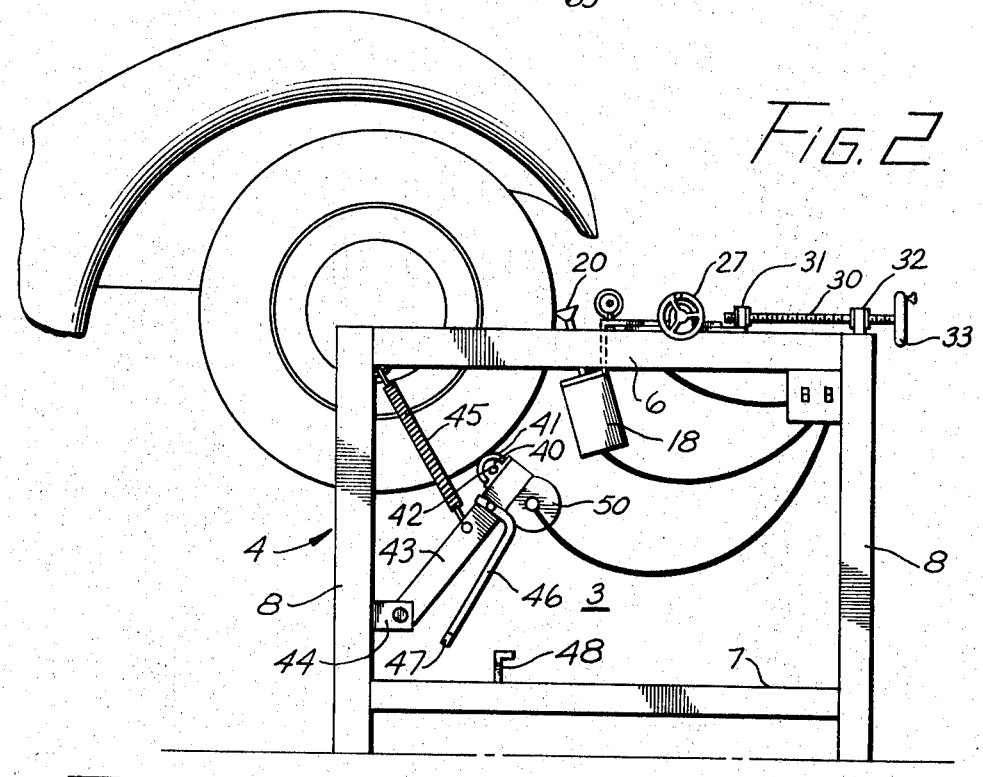

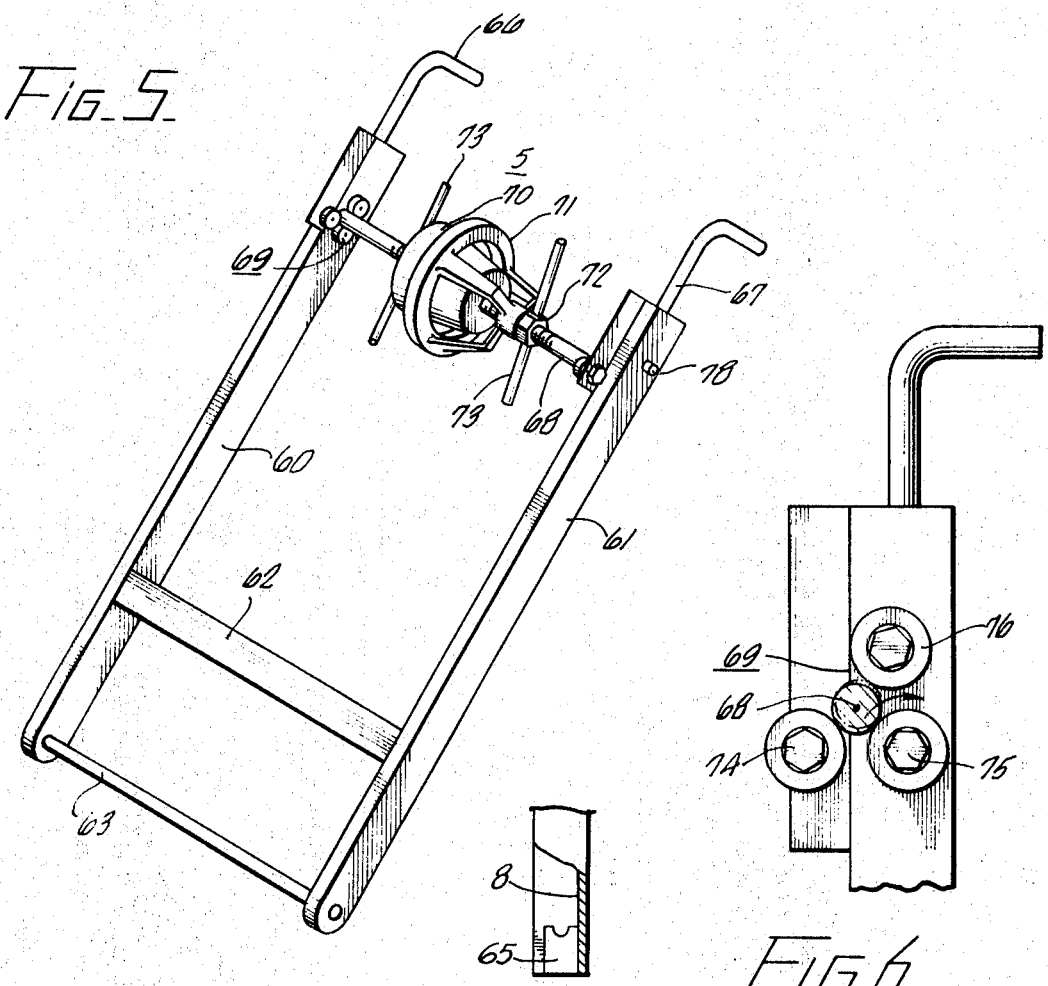

TIRE TRUING DEVICE

BACKGROUND OF THE INVENTION

Field of the Invention

This invention relates to tire truing machines, and more particularly to a machine selectively capable of truing a tire on an elevated car or a tire carried by the machine itself.

Tire truing machines have come into greater use in recent years with the advent of faster automobiles and increased speed limits on major highways. At the increased speeds, a tire having even a slight out-of-roundness may cause vibration and a shortened useful life. The out-of-roundness may be in the nature of a flat spot on the tread of the tire or a high spot. In either case, all areas on the periphery of the tire do not rotate at the same velocity and a flat spot gets flatter while a high spot gets relatively higher. Consequently, the out-of-roundness or eccentricity gets progressively worse.

The truing of tires to attain true concentricity about the axis of rotation increases the life of the tire by avoiding uneven wear and reduces wear and tear on the car by eliminating the vibration caused by eccentric tires. The truing is, of course, more effective and accurate if done while the tire is on the car on which it is to be used, because the axis of rotation during the truing operation is the same axis of rotation when the tire is in use. However, it is desirable that the same tire truing machine that is used for truing tires on cars be useful for truing tires that are off the car.

It is also desirable that one machine have the capability of truing all tires no matter what the lateral contour of the periphery of the tread of the tire is. In particular, it is desirable that the same machine be usable in truing tires having the older convex contour as well as tires having the new lateral contour of a concave center section or just a flat lateral surface.

SUMMARY OF THE INVENTION

Thus, in accordance with the present invention a tire truing machine that is simple in construction and operation and also efficient and durable and capable of being manufactured and sold at a reasonable price provides this versatility of truing any tread contour whether the tire is on or off the car.

The tire truing machine comprises a supporting frame having a partially open end with a removable carriage and lift hinged near the bottom of the frame at the partially open end. The carriage and lift carries a means for rotatably holding a tire to be trued when it is off the car, with the holding means including a shaft journaled in bearings located near the top of the carriage and lift, and means for affixing the tire on the shaft. The tire truing machine further comprises means mounted on the supporting frame for rotating the tire which may be either on an elevated car or on the shaft when the carriage and lift are locked in place at the partially open end of the frame. Locking means for locking the carriage and lift in tire truing position for truing a tire not on a car is provided on the supporting frame along with cutting means movably mounted on the frame, and means for selectively moving the cutting means longitudinally toward and away from the tire, and means for selectively moving the cutting means laterally across the periphery of the tread of the tire. The means for laterally moving the cutting means is operable from either side of the frame independently of the means for controlling the longitudinal movement of the cutting means so that the tire truing operation may be easily performed when the tires are mounted on either side of the car.

Further, the carriage and lift is removably hinged to the supporting frame so that the carriage and lift is readily detachable from the machine and when on the machine may easily be lifted into the operative position with the tire to be trued mounted on the shaft.

There are three bearings triangularly disposed on opposing arms of the carriage and lift with insufficient distance between the bearings along two sides of the triangle for passage of the shaft between the bearings and with sufficient distance between the two bearings on the third side of the triangle for passage of the shaft between the two bearings. The two bottom bearings of the three bearings journal the shaft carrying the tire when the carriage and lift is locked in place so that the wheel and tire may freely rotate to make the machine useful in balancing tires. The two bearings on the second side through which the shaft may not pass, journal the shaft when the rotating means of the machine engages the tread of the tire to be trued.

BRIEF DESCRIPTION OF THE DRAWING

The above and other features and advantages of the present invention may be understood more fully and more clearly upon consideration of the following specification and drawing in which:

FIG. 1 is a side elevation view of the tire truing machine in accordance with the present invention showing a tire in place for truing and in dotted lines, a tire ready to be lifted onto the machine through the action of the carriage and lift of the machine, also shown in dotted lines in the open position for loading the tire;

FIG. 2 is a side elevation view of the tire truing machine in accordance with the present invention showing the truing of a tire on an elevated automobile;

FIG. 3 is a front elevation view of the tire truing machine in accordance with the present invention;

FIG. 3A is a side elevation view of the support which forms a portion of the hinge for the removable carriage and lift of the machine;

FIG. 4 is a top plan view of the cutter assembly showing the design of the movable platform carrying the cutter of the machine;

FIG. 5 is a perspective view from the left side of the removable carriage and lift of the tire truing machine in accordance with the present invention;

FIG. 6 is an exploded view of the bearing saddle portion of the removable carriage and lift of the tire truing machine; and FIGS. 7A, 7B, and 7C are views of portions of tires showing the lateral contours of the periphery of the tire tread of some of the more common tires of today.

DESCRIPTION OF THE PREFERRED EMBODIMENTS

A versatile tire truing machine in accordance with the present invention adaptable for truing a tire on or off the car is shown in FIGS. 1—3. In these FIGS. there is shown a supporting frame 1, a cutter assembly 2 and a driver 3 for rotating the tire being trued. The frame 1 has a partially open end 4 in which the tire is positioned either by placing the machine under an elevated car or by mounting a tire on the machine. Wheels (not shown) may be attached to the bottom of the frame for ease of movement of the device around and under an elevated car. A carriage and lift 5 (shown in perspective in FIG. 5) is provided at the partially open end 4 for the mounting of a tire for truing that is not on a car.

The frame 1 has longitudinal side supports 6 at the top and 7 near the bottom, which are attached in a parallel spaced-apart relationship to rigid vertical legs 8. The frame has a lateral support 9 at the partially open front end 4 and two lateral supports at the back, the top one 10 of which is shown in FIG. 4.

The cutter assembly 2 is slidably mounted on the longitudinal arms 6 of the frame 1 as shown in FIGS. 3 and 4. The cutter assembly has a frame comprised of two parallel arms 12 and 13 slidably mounted on the longitudinal arms 6 and three transverse or lateral arms 14, 15, and 16 holding the parallel arms 12 and 13 in a spaced-apart relationship. A table 17 is slidably mounted on lateral arms 15 and 16 for lateral movement of the cutter with respect to the frame 1 and the tire being trued.

A motor 18 is mounted on the table 17 through a bracket 19 and is movable therewith. Motor 18 drives a cutter 20 through a shaft 21. The cutter 20 has a conical configuration with annular shaped cutting edges. The cutter assembly is movable as a whole longitudinally, while the table 17 and cutter 20 are movable laterally independent of the longitudinal movement of the assembly.

The table 17 is laterally shiftable through the cooperation of feed screw 22, nut-acting flange 23 mounted on the table 17, bearing blocks 24 and 25 mounted on arms 12 and 13, respectively, of the carriage assembly, and the left-side transverse control wheel 26 and the right-side transverse control wheel 27 attached at the opposite ends of feed screw 22. The cutter assembly is moveable longitudinally through the cooperation of feed screw 30, nut-acting flange 31 mounted on transverse arm 14 of the carriage assembly, bearing block 32 mounted on lateral arm 10 of frame 1, and longitudinal control wheel 33 attached to the end of feed screw 30.

The cutter assembly additionally includes a cutter sharpener motor 34 pivotally attached to table 17 for movement into and out of contact with cutter 20. The cutter sharpener motor 34 drives an abrasive wheel 35. The position of the abrasive wheel 35 is controlled through arm 36 that extends from the motor 34 on the end opposite the abrasive wheel 35. A microswitch 37 is mounted on control arm 36 for operation of the motor when it is desired to sharpen the cutter.

The driver 3 for the tire to be trued includes a rotatable shaft 40 having a knurled portion 41 that engages the tread of the tire to be trued, as shown in FIGS. 1 and 2. Shaft 40 is journaled in bearing blocks 42 attached to a frame 43 which is pivotally mounted to brackets 44 attached to legs 8 of frame 1.

The shaft 40 is held in engagement with the tread of the tire through the action of springs 45 connected between the frame 1 at the intersection of arm 6 and leg 8 and the frame 43 of the driver. For loading of tires and freedom of rotation of tires mounted on the machine, the driver 3 is pivotally mounted so that it may be moved out of contact with the tread of the tire. For this purpose, an arm 46 is attached to the frame 43 which arm has a lateral extension 47 that will accommodate the operator's foot to push the driver down away from the tread of the tire. The driver 3 may be locked in this position away from the tread of the tire by the cooperation of the extension 47 of arm 46 and latch 48 attached to the longitudinal arm 7 of the frame 1. The shaft 40 is driven by an electric motor 50, attached to the frame 43 of the driver 3 through the cooperation of a pulley 51, attached to the shaft of the motor 50, a pulley 52, attached to the end of the shaft 40 and a belt 53 between the pulleys.

When a tire is not on a car and is to be trued it may easily be lifted into position on the tire truing device. For this purpose, the carriage and lift 5 is hinged at its bottom to the front end of the truing machine.

Carriage and lift 5 (FIGS. 1 and 5) includes two parallel arms 60 and 61 held in a spaced-part relationship by at least one spreader arm 62. A rod 63 joins the bottom of the arms 60 and 61 and fits in slots provided in brackets 64 and 65 (shown in FIGS. 1 and 3) mounted on legs 8 at the front end of the frame 1. The mounting of bracket 65 on the leg 8 is shown in the side elevation view of the bracket 65 in FIG. 3A. In FIG. 3A the outer portion of leg 8 is broken away to show the bracket 65 and the slot therein which cooperates with the rod 63 to provide a hinge and support for the carriage and lift 5. Handles 66 and 67 (FIG. 5) are provided at the ends of arms 60 and 61, respectively, to facilitate the lifting of the carriage and lift 5 and the tire mounted thereon into the upright position for truing of the tire as shown in FIG. 1. The carriage and lift 5 is locked in its upright position by some suitable means (shown in FIG. 1) such as the rotatable locking arm 77 attached to the frame 1 and a cooperating locking bolt 78 attached to the carriage and lift 5.

The tire is mounted on a shaft 68 journaled in bearing block 69 attached to the inner surface of arms 60 and 61. An enlarged view of bearing block 69 is shown in FIG. 6. The tire may be held in place on shaft 68 in a conventional manner such as use of a conical centering block 70 and a locking ring 71, both of which are movable through cooperation of nuts, one of which, 72, is shown in FIG. 5. The nuts have tightening bars 73 attached for ease of securing the tire in place.

When the tire is mounted on the shaft 68 and is in position for lifting into tire truing position as shown in dotted lines in FIG. 1, the operator merely lifts the carriage and lift 5 so that the shaft slips into the bearing block 69. For this purpose the three bearings 74, 75, and 76 of the bearing block are triangularly positioned with the opening between bearings 74 and 76 being wide enough for passage of the shaft 68 into the bearing saddle. When the carriage and lift is in its upright position as shown in FIG. 1 the shaft 68 is journaled by bearings 74 and 75. In this position the tire is free to rotate if the driver 3 is locked away from the tire and a balancing procedure may be employed to balance the tire. When the driver 3 engages the tread of the tire, the tire and shaft 68 are lifted up and away from the driver so that the shaft 68 is journaled by bearings 76 and 75. Thus, the bearing saddle 69 advantageously provides for loading of the tire, balancing of the tire, and truing of the tire.

In operation for truing a tire as shown in FIG. 2, the machine may be placed under the elevated automobile and operated from either the right or left side. The cutter may be easily moved in a longitudinal direction or into and out of engagement with the tread of the tire and also in a lateral direction across the tread of the tire. Both of these movements may be made independently or at the same time by operation of either control wheel 26 or 27 and control wheel 33. The travel of the cutter 20 is not restricted to an arcuate movement as it is in many of the prior art devices, nor is it restricted to a purely lateral movement. Because of the ability to easily control the movement of the cutter, the tire truing device is readily usable to true tires of any configuration. For example, an operator may true a tire having a convex lateral surface as shown in FIG. 7A, or a flat surface as shown in FIG. 7B, or a combination of a convex and concave lateral surface as shown in FIG. 7C. The contours shown in FIGS. 7A through 7C are representative of the lateral tread contours of some of the more common tires in use today.

For the truing of tires on an elevated car the operator merely unlocks the carriage 5 and removes it from the front end of the frame 1 to provide an opening for the insertion of the tire to be trued. The insertion of the tire to be trued is accomplished by moving the tire truing machine under the elevated car so that the cutter 20 and driver 3 may make the necessary contact with the tread of the tire.

Thereafter, the operator releases the driver 3 to engage the tread of the tire and applies electricity to both the cutter motor 18 and the driver motor 50. The operator manipulates the longitudinal control wheel 33 to engage the cutter 20 with the tread of the tire and then manipulates either transverse control wheel 26 or 27 to move the cutter 20 across the lateral surface of the tread of the tire. The correct amount of adjustment of the wheels for the correct position of the cutter 20 as it removes the high spots on the tread of the tire may easily be determined by the luster that appears on the tread of the tire as new or unexposed rubber appears. An operator may true a tire having any contour since the movement is unrestricted in that the cutter's movement is not limited by any template or pivoting about a fixed pivot point.

Various changes may be made in the details of construction without departing from the spirit and scope of the invention as defined by the appended claims.

I claim:

1. A tire truing machine comprising a supporting frame having a partially open end; a removable carriage and lift hinged at its bottom near the bottom of said frame at the open end; means on said carriage and lift for rotatably holding the tire, said holding means including a shaft journaled in bearings located near the top of said carriage and lift and a means for affixing the tire on said shaft; means mounted on the supporting frame for rotating the tire while on either an elevated car or on said shaft when the carriage and lift is locked in place at the partially open end of the frame; means on said frame for locking said carriage and lift in tire truing position; means for cutting the tread of the tire, said cutting means being movably mounted on said frame; means for selectively moving the cutting means longitudinally toward and away from the tire; and means for selectively moving the cutting means laterally across the periphery of the tread of the tire.

2. A tire truing machine in accordance with claim 1 wherein said laterally moving means includes means for controlling the lateral movement of said cutting means from either side of said frame independently of any longitudinal movement of said cutting means.

3. A tire truing machine in accordance with claim 1 further including slots near the bottom of the frame at the partially open end of the frame, and wherein said carriage and lift comprises two parallel arms spaced apart a distance greater than the width of the largest tire to be trued, at least one spreader bar connected between the arms near the bottom of the arms to keep the arms in spaced parallelism, handles at the upper end of the arms, and pins near the bottom end of the arms that cooperate with the slots in the frame to removably hinge the carriage and lift on said frame.

4. A tire truing machine in accordance with claim 3 wherein the bearings for journaling the shaft include three bearings triangularly disposed with insufficient distance between the bearings along two sides of the triangle for passage of the shaft between the bearings and with sufficient distance between two bearings on the third side of the triangle for passage of the shaft between the two bearings, and wherein the two bottom bearings journal the shaft in a horizontal plane when the carriage and lift is in its locked position, and the two bearings removed from the cutter and the rotating means journal the shaft when the rotating means engages the tire to be trued with the side of the triangle through which the shaft may pass being toward the cutting means.

5. A tire truing machine in accordance with claim 1 wherein the carriage and lift comprises two parallel arms spaced apart a distance equal to the width of the supporting frame, at least one spreader bar connected between the arms near the bottom of the arms to keep the arms in spaced parallelism, and lift handles connected at the upper end of the arms.

6. A tire truing machine in accordance with claim 1 wherein the rotating means comprises a frame pivotally mounted on said supporting frame and carrying a rotatable shaft having a knurled portion for engaging the tread of the tire, a motor for driving the shaft, means for attaching a pair of springs on opposite sides of the frame, and a foot lever for locking said rotating means in its inoperative position away from the tire; and the machine further comprises a bent arm connected to the supporting frame for cooperating with the foot lever to lock the frame of the rotating means away from the tire; and a pair of springs attached between the supporting frame and the frame of said rotating means for urging the knurled portion of the shaft of the rotating means against the tread of the tire in the operative position of the rotating means.